(12) United States Patent
Dilger et al.

(10) Patent No.: US 6,507,188 B1
(45) Date of Patent: Jan. 14, 2003

(54) DEVICE AND METHOD FOR DETECTING THE RELATIVE POSITION OF A ROTATABLE BODY

(75) Inventors: Elmar Dilger, Leinfelden (DE); Bernd Mueller, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/856,785
(22) PCT Filed: Nov. 4, 1999
(86) PCT No.: PCT/DE99/03523
§ 371 (c)(1),
(2), (4) Date: May 24, 2001
(87) PCT Pub. No.: WO00/34746
PCT Pub. Date: Jun. 15, 2000

(30) Foreign Application Priority Data

Dec. 4, 1998 (DE) .......................... 198 55 960

(51) Int. Cl.$^7$ .............................. G01B 7/14; G01B 7/30
(52) U.S. Cl. ............................ 324/207.25; 324/207.21; 33/1 PT
(58) Field of Search ..................... 324/207.25, 207.2, 324/207.11, 207.12, 207.14, 207.21; 33/1 PT, 708

(56) References Cited

FOREIGN PATENT DOCUMENTS

| DE | 39 00 270 A | * | 7/1990 |
| DE | 195 06 938 A | * | 8/1996 |
| FR | 2 697 081 A | * | 4/1994 |

* cited by examiner

*Primary Examiner*—Edward Lefkowitz
*Assistant Examiner*—Subhash Zaveri
(74) *Attorney, Agent, or Firm*—Michael J. Striker

(57) ABSTRACT

An apparatus for detecting the angular position of a first rotatable body (10, L) has a number n of uniform angle markings or teeth (11), with at least two rotatable gear wheels (12, 13, 14, 15), which respectively have $n_1$, $n_2$, $n_3$, $n_4$ uniform angle markings or teeth. The angle markings of the at least two rotatable gear wheels (12, 13, 14, 15) cooperate with the angle markings (11) of the first rotatable body (10) in such a way that by detecting the angular positions θ, ψ of the at least two rotatable gear wheels (12, 13, 14, 15), the angular position a of the first rotatable body can be determined. When there are two of the at least two rotatable gear wheels (12, 13; 12, 14; 12, 15; 13, 14; 13, 15; 14, 15), $|n_i-n_j|>1$ and $(n_i, n_j)=1$ or $n_i$, $n_j$ are relatively prime and when there are more than two of the at least two rotatable gear wheels, $(n_i, n_j)=1$, where $1=i<N$, with N being the total number of the at least two rotatable gear wheels (12, 13, 14, 15).

3 Claims, 3 Drawing Sheets

DEVICE AND METHOD FOR DETECTING THE RELATIVE POSITION OF A ROTATABLE BODY

Figure 1:
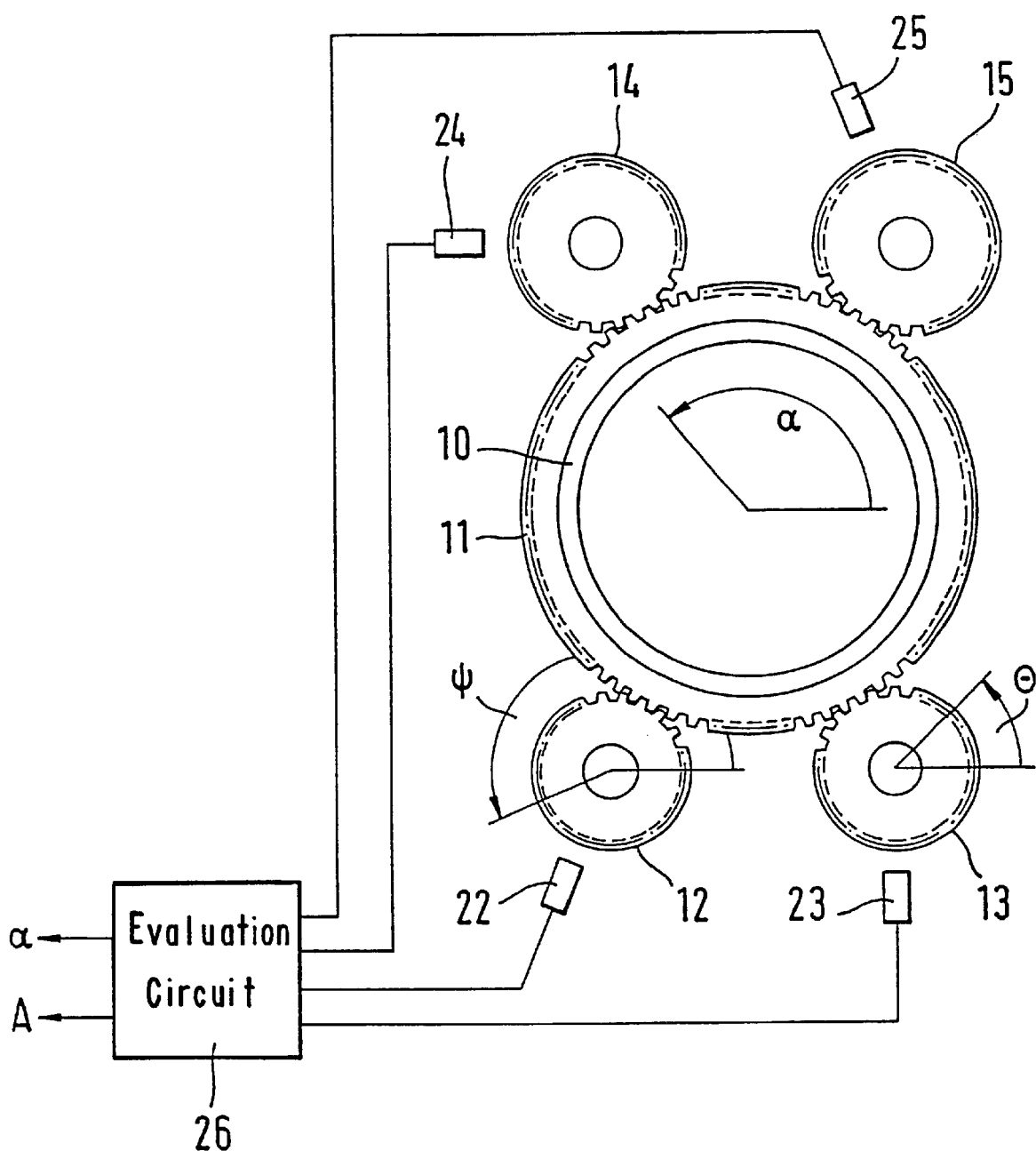

The current invention relates to an apparatus and method for measuring the angular position of a rotatable body, in particular a body which can rotate by more than 360°, according to the preambles to claims 1 and 3.

In various devices, in particular in devices which are intended to aid in the detection of the angular position of a rotatable shaft, it is necessary to know the precise position of the shaft immediately before initiating operation of the device. This requirement can best be achieved with the aid of analog angle sensors, for example potentiometers, which, after being switched on, immediately output the effective angular position value in each position, in the form of a voltage.

If such devices are used for angular measurement of angular ranges that are greater than 360°, the problem arises that it is no longer possible to determine which rotation the shaft is currently in. In order to evaluate angular ranges that are greater than 360°, though, incremental position transducers can be used in which the angular position is detected by forward and backward counting of pulses. However, incremental position transducers of this kind cannot be used to execute absolute angle measurement because only those increments which move past a pickup can be counted.

DE-OS 195 06 938 has disclosed an apparatus for detecting the angular position of a rotatable body which has a number of uniform angle markings or teeth and has at least two additional rotatable bodies which have a different number of uniform angle markings or teeth. In this connection, the rotation angle of the two additional rotatable bodies is detected and based on these, the angular position of the rotatable body is determined. The rotating bodies used in this case are gears, wherein the rotatable body to be measured has n teeth and the two additional gears have m and m+1 teeth.

The object of the invention is to produce an apparatus and a method with which it is particularly simple to measure an angle of a rotatable body, in particular a body which can rotate by more than 360°.

This object is obtained by means of an apparatus with the characteristics of claim 1 and a method with the characteristics of claim 3.

According to the invention, it is possible to detect the angular position of a rotatable body, for example a steering wheel, in a very simple and error-tolerant manner. Particularly when using a greater number of additional rotatable bodies which cooperate with the rotatable body, a higher degree of error tolerance and a better angular resolution is produced in comparison to conventionally known systems.

The angles θ and ψ of the additional rotatable bodies can be suitably detected by means of periodic angle sensors and the angle α Of the first rotatable body can be suitably determined in an evaluation circuit by taking into account the angles θ, ψ and the numbers n, $n_i$, $n_j$ of the respective angle markings. If periodic angle sensors of this kind are used, it is very simple to mathematically evaluate the angles θ and ψ by taking into account the respective numbers of angle markings since the evaluation can be executed by means of trigonometric functions.

According to a preferred embodiment of the apparatus according to the invention, the angle sensors operate in pairs as absolute value transducers and in particular are embodied as AMR angle sensors, which scan magnets which are connected to the additional rotatable bodies. AMR angle sensors of this kind are relatively inexpensive to obtain and prove to be very rugged and reliable in actual use.

A preferred embodiment of the current invention will now be described in conjunction with the accompanying drawings.

Figure 2A:
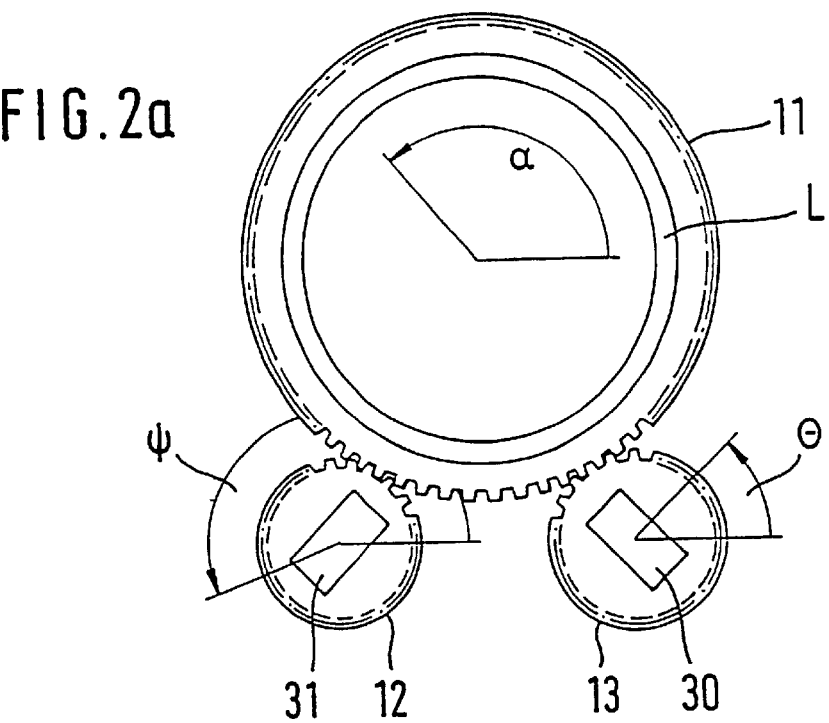
Figure 2B:
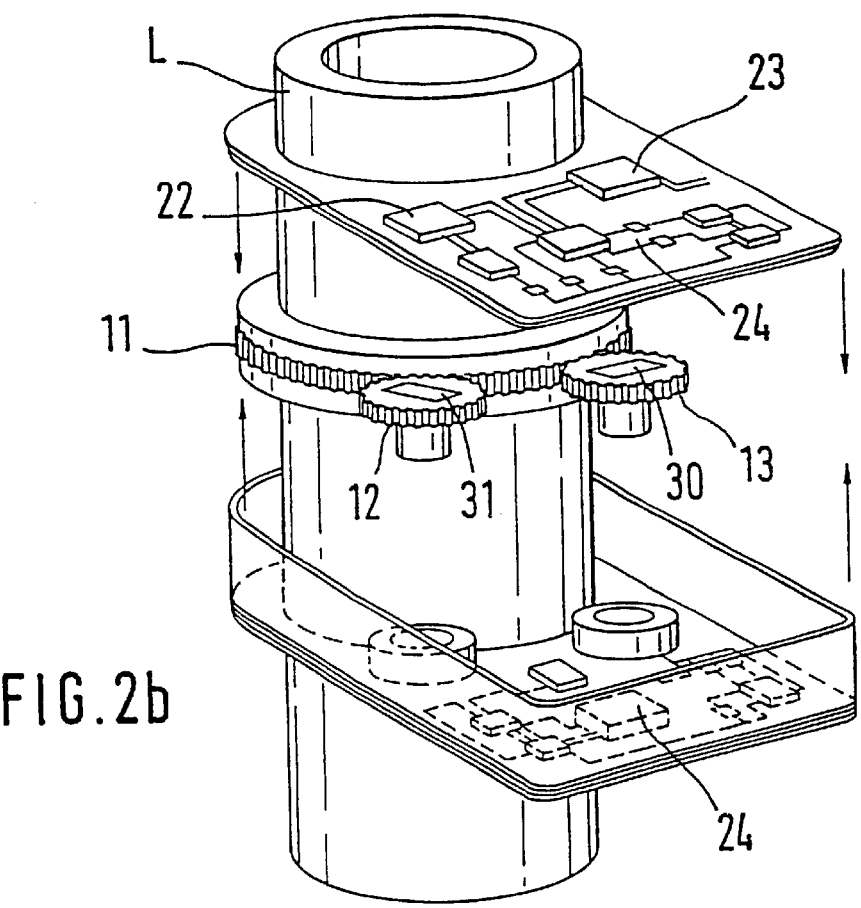
Figure 3:
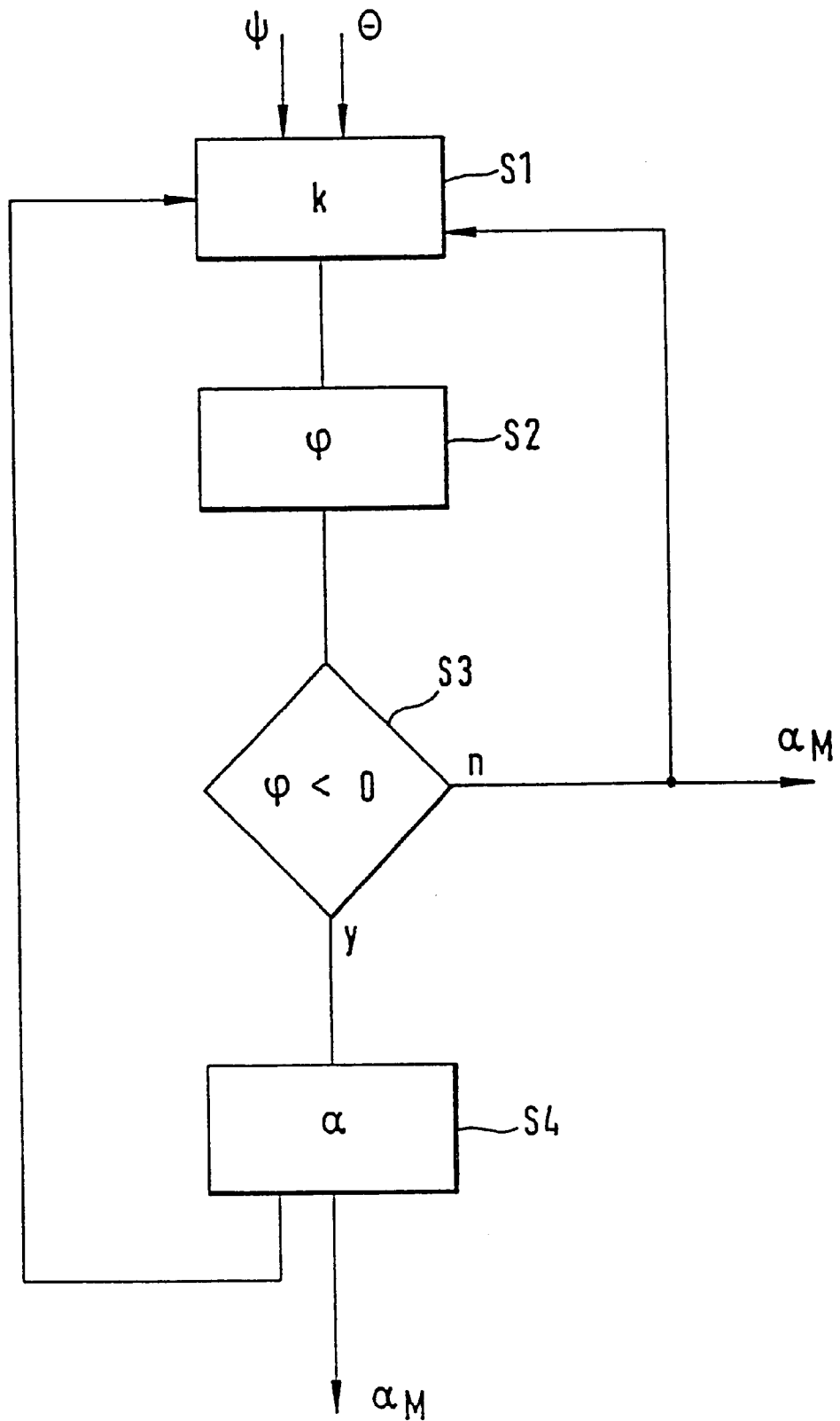

FIG. 1 is a schematic view of a first preferred embodiment of the apparatus according to the invention which can be used to detect the angle of a shaft that can rotate by more than 360°, FIG. 2 shows the exemplary embodiment of a steering angle sensor, wherein FIG. 2a shows a top view of the disposition of the gears and FIG. 2b shows a perspective view of the entire apparatus for detecting the steering angle, including the associated sensors and an evaluation circuit, and FIG. 3 is a flow chart of a preferred embodiment of the method according to the invention.

In FIG. 1, the reference numeral 10 refers to an axle whose rotation angle α should be measured. This axle 10 has a gear 11 attached to it which has n teeth. Four additional gears 12, 13, 14, 15 engage with the gear 11 from a fixed position. The equation ($n_i$, nj)=1, (1=i<j=4) applies to the number of teeth of the gears 12 to 15, i.e. the tooth counts of the individual gears are relatively prime in pairs. For example, let the following tooth counts be assumed: tooth count n of the gear 11: 100, tooth count $n_1$ of the gear 12: 29, tooth count $n_2$ of the gear 13: 31, tooth count $n_3$ of the gear 14: 37, and tooth count $n_4$ of the gear 15: 41.

The gears 12, 13, 14, 15 are each associated with respective periodic sensors 22, 23, 24, and 25. In particular, photoelectric or contactless electromagnetic sensors, which make use, for example, of the Hall effect or the magnetoresistive effect, can be used as angle sensors. It is assumed that the angle sensors 22, 23, 24, 25 supply sinusoidal or cosine-shaped output signals (periodicity 360° or an integral divisor of 360°).

The angle sensors 22, 23, 24, 25 are connected to an electronic evaluation circuit 26 in which the calculations required for determining the axle angle α are carried out.

For the case in which the tooth counts of the gears 12, 13, 14, 15 are relatively prime, each sensor pair (22, 23; 22, 24; 22, 25; 23, 24; 23, 25; 24, 25) constitutes an absolute sensor within a particular range of the absolute angle, namely over ±2 complete rotations of the gear 10.

For example let us consider the gears 12, 13 and the sensors 22, 23 associated with them. It should be pointed out that an angle or an angular position α of the gear 11 is definitely determined by means of the output signals of the two sensors 22, 23. This means that the angle α can be calculated if the four values sin $n/n_1$ α, cos $n/n_1$ α, sin $n/n_2$ α, and cos $n/n_2$ α are known.

Let us assume that there are α ? β in which $$\sin n/n_1 \alpha = \sin n/n_1 \beta,$$

$$\sin n/n_2 \alpha = \sin n/n_2 \beta,$$

$$\cos n/n_1 \alpha = \cos n/n_1 \beta,$$

and $$\cos n/n_2 \alpha = \cos n/n_2 \beta.$$

There are therefore values $k_1$ and $k_2$, in which $$n/n_1 \beta = n/n_1 \alpha + k_1 \cdot 360°$$

and $$n/n_2 \alpha = n/n_2 \alpha + k_1 \cdot 360°.$$

Consequently, the relation $n_1 \cdot k_1 = n_2 \cdot k_2$ is true. It is also true that: $(n_1, n_2) = 1$, $k_2 = n_1$, and $k_1 = n_2$.

If the angle sensor is now in a position to determine an absolute angle in the range of ±2 rotations, the values n, $n_1$, $n_2$ are selected in such a way that $n_1 \cdot n_2 = 4 \cdot n$, thus yielding the relation $|\beta - \alpha| = 4 \cdot 360°$. Consequently, the angle $\alpha$ is definitely determined within a range of ±2 rotations. The gear pair 11, 13 or sensor pair 22, 23 therefore constitutes an absolute sensor.

Assuming that in pairs, the angle sensors 22, 23, 24, 26 constitute so-called absolute sensors, immediately after the device for detecting the angular position of the shaft 10 is switched on, they supply the rotation angle of the gear respectively associated with them that is present at the time of the switching-on (only the rotation angles $\psi$ and $\theta$ of the gears 12 and 13 are shown). Based on these angles, the angle $\alpha$ of the shaft 10 can be definitely determined, provided that the number n of teeth of the gear 11 and the numbers $n_1$, $n_2$ of teeth of the gears 12, 13 are known, as is demonstrated below.

Let us in turn consider (for example) the gears 12, 13 and the associated sensors 22, 23 in pairs. Any other gear pairs or sensor pairs can also be used to detect the rotation angle $\alpha$. The numbers of teeth n, $n_1$, $n_2$ of the individual gears must be selected, as described above, in accordance with the magnitude of the angle a to be detected. In order to simplify the mathematical representation, let it be furthermore assumed below, without limitation to the universal applicability, that $n_1 > n_2$ and $n_1 = n_2 + 1$. The calculations depicted can be used analogously for any other relatively prime number pairs $n_1$, $n_2$ in which $n_1 > n_2 + 1$. The calculation of the rotation angle $\alpha$ takes place after the apparatus according to the invention is switched on, in accordance with a method that can be inferred from FIG. 3, for example. In a first step S1 in the evaluation circuit 26, the next whole number of the expression $$k = \frac{n_1 \cdot \theta - n_2 \cdot \psi}{\Omega} \quad (1)$$

is calculated, where the angles $\theta$ and $\psi$ have been previously measured. As step S2, the angle $\alpha$ is then calculated, where the following equation applies:

$$\alpha = \frac{n_2 \cdot \psi + n_1 \cdot \theta - 2n_2 k\Omega - k\Omega}{2n} \quad (2)$$

In step S3, a check is executed as to whether the previously detected value $\alpha$ is negative. If this is the case, then in step S4, the full angle period is added, hence:

$$\alpha^1 = \alpha + \frac{n_1 + n_2}{n} \cdot \Omega \quad (3)$$

The angle $\alpha^1$ thus obtained is then adopted as the actual measurement value $\alpha M$. However if it is determined in step S3 that $\alpha$ is not less than 0, then the angle detected in step S2 is output as the measured angle $\alpha M$.

After the output of the measurement value $\alpha M$, the next angle detection of the next measured angles $\theta$ and $\psi$ begins in step S1.

The measurement error E of the individual angle sensors 22, 23 is transmitted to the error of the angle $\alpha$ in the proportion $n_2/n$ according to equation (2) so that the measurement precision can be set through a suitable selection of the transmission proportion $n_2/n$. However, if the measurement error of the individual sensors is so great that in the rounding according to equation (1), an incorrect whole number k is calculated, then the detected angle $\alpha$ does not change continuously, but changes discretely by the amount:

$$\Delta \alpha = \pm \frac{2n_2 + 1}{2n} \cdot \Omega \quad (4)$$

This can be counteracted by the change in the value for k being executed according to formula (1). With the continuous transition from $\psi$ and/or $\theta$ via $\Omega$ toward 0 and vice versa, the value of k can only assume integral changes of $\pm n_1$ and $\pm n_2$. If a different jump is registered, this is an indication of an excessive measurement error or a defective individual sensor. The succession of values for k detected in step S1 in the method according to FIG. 3 can thus be compared to one another and in the event of implausible changes, an error can be detected. An error indication A (see FIG. 1) can then be output by the evaluation circuit 26. It is particularly favorable that such plausibility tests in the exemplary embodiment shown can be carried out for different sensor pairs and compared with one another.

In order for the correct value for k to be obtained, the angular error of the individual sensors 22, 23 must be less than $$\delta = \pm \frac{0.5 \cdot \Omega}{2n_2 + 1} \quad (5)$$

where the maximal angular error for the angle $\alpha$ is calculated as follows:

$$\delta \alpha = \frac{n_2 \cdot \Omega}{2n \cdot (2n_2 + 1)} \quad (6)$$

Greater angular errors of the individual sensors lead to a jump of $\alpha$, which can be detected by means of the impermissible change of k.

The possibility of calculating the rotation angle $\alpha$ from the two angles $\psi$ and $\theta$ can be explained as follows:

Based on the tooth counts, the interrelationships between the angle $\alpha$ and the two angles $\psi$ and $\theta$ are $$\psi = \frac{n}{n_1} \cdot \alpha \bmod \Omega \qquad (\text{mod} = \text{Modulo}) \quad (7)$$

$$\psi = \frac{n}{n_2} \cdot \alpha \bmod \Omega \quad (8)$$

Since both angles recur after the angle $\Omega$, only the remainder of the division by $\Omega$ has to be used.

The reversions of (7) and (8) are as follows:

$$\alpha = \frac{n_1}{n} \cdot (\psi + i \cdot \Omega) \quad \text{and} \quad (9)$$

$$\alpha = \frac{n_2}{n} \cdot (\theta + j \cdot \Omega) \quad (10)$$

wherein i and j are initially unknown whole numbers since for example with an angle $\psi$ between 0° and $\Omega$, it is not known how many times $\psi$ has rotated over $\Omega$.

However, since (9) and (10) must yield the same angle $\alpha$, then (9)=(10), which produces the relation:

$$n_1 \cdot i - n_2 \cdot j = \frac{n_2 \cdot \theta - n_1 \cdot \psi}{\Omega}. \quad (11)$$

The left side of (11) is a whole number so that the right side must also be integral:

$$k = \frac{n_2 \cdot \theta - n_1 \cdot \psi}{\Omega} \quad (12)$$

Since the angles θ and ψ contain errors (principle and statistical measurement errors, digitizing), as a rule (12) is not integral. But if the next whole number of this expression is selected, then the errors in the angles are sharply reduced. Equation (11) then reads:

$$n_1 \cdot i - n_2 \cdot j = k \quad (13)$$

This is an equation for two unknowns i and j. But since i and j must be integral, (13) has discrete solutions (a so-called diophantine equation). The only solution required for the evaluation can be easily found for the case $n_1 = n_2 + 1$, which is shown by way of example:

$$i = j = -k \quad (14)$$

With these values, α can be calculated as the average of (9) and (10), as a result of which possible measurement errors can be reduced again.

$$\alpha = \frac{n_2 \cdot \psi + n_1 \cdot \theta - 2n_2 k\Omega - k\Omega}{2n} \quad (15)$$

The angle α thus calculated can assume both positive and negative values. In order to obtain a continuous representation, with negative values, the full period of the entire system must be added, as has already been explained in conjunction with equation (3).

FIGS. 2a and 2b show an apparatus according to the invention for measuring the angle of the steering axle L of a motor vehicle. To this end, a sensor is used which is as contactless as possible and typically can detect four steering wheel rotations or rotations of the steering axle. The steering axle L is embodied with a gear 11 which, analogous to the apparatus shown in FIG. 1, cooperates with four gears. For the sake of simplicity, only two of the gears, namely the gears 12, 13 are shown in detail.

The steering axle L, whose angle α is to be detected corresponds to the shaft labeled with the reference numeral 10 in FIG. 1. The interrelationships according to FIG. 1 apply to the gears and to the plotted angles θ and ψ. In addition, magnets 30, 31 are disposed on the gears 12 and 13 and their magnetization is disposed in the plane of the gears. The angles ψ and θ are measured with the aid of two angle sensors 22, 23, which are embodied as AMR (anisotropic magnetoresistive) sensors. An example for the assembly of a steering wheel sensor can be inferred from FIG. 2b. In this example, the three gears 11, 12, 13 are disposed in one plane. The magnets 30, 31 are disposed on the gears 12 and 13. The angles θ and ψ can be absolutely detected with the aid of these magnets and the two AMR angle sensors 22, 23. The evaluation circuit which processes the output signals of the AMR sensors is depicted as a hybrid circuit 24. The detection of the angles ψ and θ takes place through the detection of magnetic field patterns that are produced by the magnets 30, 31.

Instead of AMR sensors, other angle sensors, for example Hall-based angle sensors, optical sensors, inductive, capacitive, or resistive sensors can also be used. Depending on the sensor type used, it is necessary to suitably adapt the gears. Instead of gears, code disks can also be used, which have suitable code systems applied to them.

It should be noted that the apparatus for angle detection depicted has very favorable error tolerance properties. For example, when four gears 12, 13, 14, 15 are used, there are six gear pairs or sensor pairs, as has already been mentioned, as a result of which three succeeding sensor errors can be detected and two succeeding sensor errors can be corrected.

What is claimed is:

1. An apparatus for detecting the angular position of a first rotatable body (10, L), which has a number n of uniform angle markings or teeth (11), with at least two rotatable gear wheels (12, 13, 14, 15), which respectively have $n_1$, $n_2$, $n_3$, $n_4$ uniform angle markings or teeth, wherein the angle markings of the at least two rotatable gear wheels (12, 13, 14, 15) cooperate with the angle markings (11) of the first rotatable body (10) in such a way that by detecting the angular positions θ, ψ of the at least two rotatable gear wheels (12, 13, 14, 15), the angular position α of the first rotatable body can be determined, characterized in that when there are two of said at least two rotatable gear wheels (12, 13; 12, 14; 12, 15; 13, 14; 13, 15; 14, 15), $|n_i - n_j| > 1$ and $(n_i, n_j) = 1$ $n_i$, $n_j$ are relatively prime and when there are more than two of said at least two rotatable gear wheels, $(n_i, n_j) = 1$, where $1 = i < j = N$, with N being the total number of the at least two rotatable gear wheels (12, 13, 14, 15), wherein the angular positions θ and ψ can be detected by means of periodic angle sensors (22, 23, 24, 25) and the angular position α can be determined in an evaluation circuit (16) by taking into consideration the angular positions θ and ψ and the numbers n, $n_i$, $n_j$ of the angle markings.

2. The apparatus according to claim 1, wherein the angle sensors (22, 23, 24, 25) operate in pairs as absolute value transducers and in particular as AMR angle sensors, which scan magnets (30, 31) which are connected to the at least two rotatable gear wheels (12, 13, 14, 15).

3. A method for measuring the angle of a rotatable body (10, L), in particular a body which can rotate by more than 360°, which has a number of uniform angle markings or teeth (n) and cooperates with at least two rotatable gear wheels (12, 13, 14, 15), which respectively have $n_1$, $n_2$, $n_3$, $n_4$ uniform angle markings or teeth, wherein the angles θ, ψ of the at least two rotatable gear wheels (12, 13, 14, 15) are detected and the angular position α of the first rotatable body is determined from the angles θ and ψ, characterized in that for the angle markings or teeth of the at least two rotatable gear wheels (12, 13, 14, 15), the following equations apply:

if there are two of said at least two rotatable gear wheels,), $|n_i - n_j| > 1$ and $(n_i, n_j) = 1$ and if there are more than two of said at least two rotatable gear wheels, $(n_1, n_j) = 1$ $(1 i < j = N)$, where N is the total number of the at least two rotational gear wheels (12, 13, 14, 15), wherein the angles θ and ψ are detected by means of periodic angle sensors (22, 23, 24, 25) and the angle α can be determined in an evaluation circuit (16) by taking into consideration the angles θ and ψ and the numbers n, $n_i$, $n_j$ of the angle markings.

* * * * *